United States Patent Office 3,109,002
Patented Oct. 29, 1963

3,109,002
THIACHROMONO-(2,3-b) ACRIDONES AND
PROCESS FOR THEIR PRODUCTION
Donald Graham Wilkinson, Manchester, England, assignor to Imperial Chemical Industries Limited, London, England, a corporation of Great Britain
No Drawing. Filed Mar. 23, 1961, Ser. No. 97,767
Claims priority, application Great Britain Apr. 4, 1960
5 Claims. (Cl. 260—279)

This invention relates to new pigments and more particularly it relates to new pigments suitable for the coloration of paints, printing inks, rubber and artificial polymeric materials and for the mass coloration of fiber-forming materials.

The pigments of the invention are of a new polycyclic type which we designate as thiachromono[2:3-b]acridones and in this specification the following system of numbering is used for the parent ring system of these new polycyclic compounds

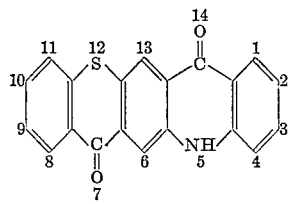

According to the invention there are provided new pigments or pigmentary compositions which consist of or comprise one or more compounds of the formula

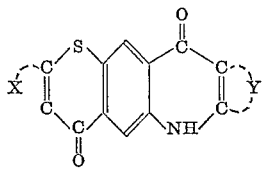

wherein X and Y each represent the atoms necessary to complete a benzene ring or a system of fused 6-, or 6- and 5-membered rings and wherein the rings or ring systems represented by X and Y may carry non-ionic substitutents.

As examples of systems of fused rings which may be completed by the atoms represented by X and Y there may be mentioned naphthalene, pyrene and carbazole. Such ring systems must be free from ionic solubilizing groups such as sulphonic acid, carboxylic acid and quaternary ammonium groups.

As examples of non-ionic substitutents which may be carried by X and Y there may be mentioned halogeno for example chloro and bromo; nitro; alkyl for example methyl and ethyl; substituted alkyl for example trifluoromethyl; aryl for example phenyl and p-tolyl; carbamyl and substituted carbamyl for example N-methylcarbamyl, N:N-dimethylcarbamyl and N-phenylcarbamyl; carbalkoxy for example carbomethoxy; sulphamyl and substituted sulphamyl for example N-methylsulphamyl, N-β-hydroxyethylsulphamyl and N:N-dimethylsulphamyl; amino; alkylamino for example methylamino; dialkylamino for example dimethylamino; arylamino for example anilino; acylamido for example acetylamido, α-furoylamido, p-toluene sulphonamido and aroylamido such as benzoylamido and substituted benzoylamido (for example o-, m-, and p-chloro, -methoxy or -nitro benzoylamido), phthalimido and β-naphthoylamido; alkyl and aryl-ureido and -thioureido for example n-butyl- and phenyl-ureido and -thioureido; arylideneamino for example benzylidineamino; alkanesulphonyl for example methanesulphonyl and chloromethanesulphonyl; hydroxy; alkoxy, for example methoxy, ethoxy and β-hydroxy ethoxy; and aryloxy for example phenoxy and cresoxy. It is to be understood that more than one of these substituents may be present.

According to a further feature of the invention there is provided a process for the manufacture of new pigments or pigmentary compositions as hereinbefore defined which comprises cyclizing one or more dicarboxylic acids of the formula

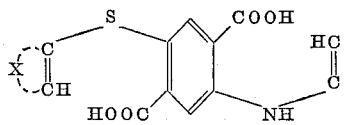

or esters thereof wherein X and Y have the meanings ascribed above, by treatment with a dehydrating or condensing agent.

As examples of esters of carboxylic acids of the above formula there may be mentioned the methyl and ethyl esters.

The cyclization may be carried out for example by heating with dehydrating agents such as sulphuric acid, phosphoric acid, polyphosphoric acid or chlorosulphonic acid. In carrying out the process of the invention the dicarboxylic acid or ester may, for example, be dissolved in concentrated sulphuric acid and the solution heated at between 70° C. and 150° C. for a short time, for example at between 130° and 140° for 15 minutes.

When phosphoric acid or polyphosphoric acid is used as dehydrating agent it is usually necessary to heat the solution of the dicarboxylic acid or ester at a higher temperature and for a longer time, for example at between 160° C. and 180° C. for 10 hours. When chlorosulphonic acid is used as dehydrating agent it is not usually necessary to heat the solution of the dicarboxylic acid or ester at all, cyclization being usually completed after stirring for a few minutes at 20° C. or for 1 hour at between −5° and 0° C.

After the cyclization has taken place, the pigment or pigmentary composition may be precipitated from solution in sulphuric, phosphoric, polyphosphoric or chlorosulphonic acid by pouring the solution into water and it may then be isolated by filtration and washing.

Other dehydrating or condensing agents such as phosphorus tri- and penta-chloride and aluminum chloride may be employed for the cyclization of the dicarboxylic acid or ester. It is sometimes advantageous to employ a reagent commonly used for the production of acid chlorides, for example thionyl chloride or phosphorus trichloride, in conjunction with a condensing agent such as aluminum chloride.

As examples of dicarboxylic acids and esters which may be cyclized in the process of the invention there may be mentioned 2 - anilino - 5 - phenylmercaptoterephthalic acid, 2 - (4' - chlorophenylamino) - 5 - phenylmercaptoterephthalic acid, 2-phenylamino-5-(4'-chlorophenylmercapto)terephthalic acid and 2-(4'-chlorophenylamino)-5-4''-chlorophenylmercapto)terephthalic acid and the corresponding methyl and ethyl esters.

The dicarboxylic acids and esters used in the process of the invention may conveniently be obtained from 2-chloro-5-nitroterephthalic acid or an ester thereof, by condensation with the appropriate mercapto compound or amine followed by reduction of the nitro group to amino, replacement of the amino group by a halogen atom (for example chlorine) by means of the Sandmeyer reaction and subsequent condensation with the appropriate amine or mercapto compound. The dicarboxylic acids and esters may also be obtained from dialkyl-2:5-dihalogenoterephthalates by condensation with a mercapto compound and an amine (if desired without isolation of the intermediate condensation product). During such condensations hydrolysis of the ester groups may occur, so that a dicarboxylic acid is obtained directly.

Those new pigments of the invention in which the rings or ring systems represented by X and Y carry acylamido groups as substituents may also be manufactured by acylation of the corresponding amino compounds, using an acid chloride, anhydride or ester.

The products obtained by carrying out the process of the invention are usually crystalline in nature and may be converted into a finely divided pigmentary form in known manner either singly, or in admixture with other thiachromono[2:3-b]acridones or with other pigments such as lin-quinacridones or benzobisthiachromones, for example by grinding, acid pasting, salt milling or treatment with an organic liquid such as phenol, cresol, xylene, dimethylsulphone or dimethylformamide, if desired at an elevated temperature. In some cases the crystalline form of the pigments of the invention can be modified by the application of such procedures.

The pigments of the invention are useful for incorporation in printing inks, paints, lacquers and stoving enamels and for the coloration of rubber and artificial polymeric materials such as cellulose acetate, polyvinyl chloride, polythene and polystyrene and fiber-forming materials such as polyesters and polyamides. They give bright yellow to purple shades of very good fastness properties.

Thiachromono-[2:3-b]-acridones in which one or both of the two outermost rings carry halogen atoms (especially chlorine atoms) as substituents are of especial value as pigments on account of their outstanding resistance to change on exposure to the weather.

The invention is illustrated but not limited by the following examples in which the parts are by weight.

*Example 1*

4.7 parts of 2-phenylamino-5-phenylmercaptoterephthalic acid are added gradually to 25 parts of tetraphosphoric acid with stirring at 150° C. The mixture is stirred at 150° C. for 1 hour, and is then allowed to cool to about 100° C. and slowly diluted with 100 parts of water. The orange product in suspension is filtered off, washed until free from acid, stirred with 250 parts of 2% sodium carbonate solution, and boiled with 200 parts of 5% alcoholic potassium hydroxide solution. The deep magenta solution which is obtained is filtered and added to hot dilute hydrochloric acid, and the precipitated bright orange thiachromono[2:3-b]acridone is filtered off, washed and dried. The product contains 72.5% of carbon, 3.3% of hydrogen, 4.2% of nitrogen and 10.0% of sulphur, $C_{20}H_{11}O_2NS$ requires 73.0% of carbon, 3.3% of hydrogen, 4.25% of nitrogen and 9.7% of sulphur. The light absorption curve of a solution in sulphuric acid shows maxima at 388, 580 and 639 millimicrons.

A mixture of 4 parts of the product and 40 parts of dry sodium chloride is ball-milled with steel balls for 48 hours. The salt-pigment mixture is separated from the balls and stirred at 50° C. for 24 hours with about 50 parts of dimethylformamide. The mixture is then diluted with water, filtered and the filter cake is stirred at between 90° and 95° C. for ½ hour with 500 parts of 5% sulphuric acid to remove traces of iron. The solid is then filtered and washed free from acid and the paste is stirred with 0.4 part of pine oil and dried at 50° C. A bright orange pigment is so obtained which when incorporated into paints gives bright orange shades of very good fastness properties.

*Example 2*

6.6 parts of 2-(4'-chlorophenylamino)-5-phenylmercaptoterephthalic acid is added gradually to 33 parts of tetraphosphoric acid with stirring at 180° C. The mixture is stirred at 180° C. for 1 hour and is cooled to about 100° C. and slowly diluted with 100 parts of water.

The red product is filtered off, washed until free from acid, stirred with 250 parts of 2% sodium carbonate solution and boiled with 200 parts of 5% alcoholic potassium hydroxide solution. The deep magenta solution is filtered and acidified and the precipitated 2-chloro-thiachromono-[2:3-b]-acridone is filtered off. It is converted into pigmentary form by salt milling and treatment with dimethylformamide as described for the product of Example 1. A scarlet pigment of very good fastness properties is obtained. The light absorption curve of a solution in sulphuric acid shows maxima at 391, 430, 595 and 644 millimicrons. The X-ray diffraction pattern of this material shows a strong line corresponding to an interplanar spacing of 3.44 Angstrom units, medium lines at 5.95, 5.7, 3.76, 3.23 and 3.07 Angstrom units and weak lines at 8.15, 5.0, 4.85, 4.03, 3.37 and 3.10 Angstrom units.

Instead of carrying out the above extraction with 200 parts of 5% alcoholic potassium hydroxide the crude reaction product may be purified by dissolving 9.1 parts in 165 parts of concentrated sulphuric acid and adding very gradually with good stirring and cooling 25 parts of water. The sulphate of 2-chlorothiachromono-[2:3-b]-acridone separates in stout prisms which are filtered off, washed with 85% sulphuric acid and decomposed with dilute ammonia. A bright scarlet powder is so obtained which has a different X-ray diffraction pattern compared with the alcoholic potassium hydroxide purified material. The diffraction pattern shows a strong line corresponding to an interplanar spacing of 3.23 Angstrom units, medium lines at 7.9, 6.3, 5.7 and 3.75 Angstrom units and weak lines at 4.75 and 3.95 Angstrom units.

The sulphuric acid purified material may be converted into pigmentary form by milling with salt and treatment with dimethylformamide as described in Example 1. The X-ray diffraction pattern of the pigment obtained in this manner shows strong lines corresponding to interplanar spacings at 3.43 and 3.39 Angstrom units, medium lines at 15.0, 10.0, 6.75, 4.17, 3.81, 3.69 and 3.29 Angstrom units and weak lines at 6.5, 6.1, 5.5, 5.0, 4.95, 4.76, 4.49, 4.28, 3.22, 3.20, 3.11, 3.05, 2.93 and 2.84 Angstrom units. This pigment when incorporated into paints and other surface coatings gives bright scarlet red shades of excellent fastness to solvents, heat and light and excellent resistance to change and exposure to the weather. It can also be used to produce very fast red colorations in plastics and fiber forming materials.

*Example 3*

4.7 parts of 2-phenylamino-5-(4'-chlorophenylmercapto) terephthalic acid is added gradually to 23.5 parts of tetraphosphoric acid with stirring at between 150° and 160° C. The mixture is stirred for a further period of 1 hour at between 150° and 160° C., cooled to about 100° C. and slowly diluted with 100 parts of water. The product is isolated and purified as described for the product of Example 1.

9-chloro-thiachromono-[2:3-b]acridone is so obtained as a bright red powder. It is converted into pigmentary form by salt milling and treatment with dimethylformamide as described for the product of Example 1. A bright red pigment of very good fastness properties is obtained. The light absorption curve of a solution in sulphuric acid shows maxima at 393, 600 and 650 millimicrons.

*Example 4*

4.6 parts of 2-(4'-chlorophenylamino)-5-(4''-chlorophenylmercapto)-terephthalic acid is dissolved in 90 parts of concentrated sulphuric acid and the solution is gradually heated during 30 minutes to between 130° and 140° C. and maintained at this temperature for 15 minutes. The deep green solution is cooled down to room temperature and 25 parts of water is added gradually with stirring and cooling. The precipitated 2:9-dichloro-thiachromono-[2:3-b]-acridone sulphate is filtered off, redissolved in 75 parts of concentrated sulphuric acid and reprecipitated by the gradual addition of 7 parts of water It is then filtered off and decomposed with dilute sodium carbonate. The product is filtered, washed alkali free, dried, and converted into pigmentary form by salt-milling and treatment with dimethylformamide as described for the product of Example 1. The bright scarlet pigment so obtained shows an X-ray diffraction pattern with lines corresponding to interplanar spacings as follows: strong lines, 12.8 and 3.41 Angstrom units; medium lines at 7.8, 6.2, 5.8, 5.4, 3.77, and 3.33 Angstrom units and weak lines at 11.0, 10.1, 7.2, 4.95, 4.25, 3.91, 3.22 and 3.08 Angstrom units.

2:9-dichloro-thiachromono-[2:3-b]-acridone may also be obtained by heating 16.3 parts of 2-(2'-chlorophenylamino) - 5 - (2''-chlorophenylmercapto)-terephthalic acid with 81.5 parts of tetraphosphoric acid at 150° to 160° C. for 1½ hours. The crude product, isolated as described in the preceding examples may be purified by precipitation from concentrated sulphuric acid. Found 59.6% of carbon, 2.0% of hydrogen and 3.6% of nitrogen. $C_{20}H_9O_2NSCl_2$ requires 60.3% of carbon, 2.3% of hydrogen and 3.5% of nitrogen. This product may be converted into pigmentary form by milling with salt and treatment with dimethylformamide as described for the product of Example 1. The pigment so obtained shows an X-ray diffraction pattern with a strong line corresponding to an interplanar spacing of 3.20 Angstrom units; medium lines at 5.9, 3.83 and 3.62 Angstrom units and weak lines at 5.4, 4.55, 4.13, 3.79, 3.31 and 3.23 Angstrom units. The pigments obtained by either of the two methods described in this example, when incorporated in paints or other surface coatings give bright red shades of excellent fastness to solvents, heat and light and resistance to change on exposure to the weather. They also give extremely fast red shades when used for the coloration of plastics and the mass pigmentation of fiber forming materials.

*Example 5*

10.3 parts of 2(4'-chlorophenylamino)-5-(4''-acetylaminophenylmercapto)-terephthalic acid is added gradually during 1 hour to 52 parts of tetraphosphoric acid stirring at 150° C. The temperature is maintained at 150° for 1 hour and the mixture is cooled to 100° and gradually diluted with about 50 parts of water. The precipitated 2 - chloro - 9 - acetylamino-[2:3-b]-thiachromonoacridone is filtered off and heated with dilute sodium carbonate solution to dissolve impurities. The bluish red powder so obtained is hydrolyzed to 2-chloro-9-amino-thiachromono-[2:3-b]-acridone by dissolving 5 parts in 45.0 parts of concentrated sulphuric acid adding gradually 2 parts of water and stirring at 150° to 160° C. for 1 hour. The amine sulphate which separates on cooling is filtered off, washed with 95% sulphuric acid and decomposed to the free amine by boiling with dilute sodium carbonate solution. The product, isolated by filtration, washing and drying forms a bluish red powder.

*Example 6*

1.7 parts of finely powdered 2-chloro-9-aminothiachromono-[2:3-b]-acridone is boiled with 45 parts of dry pyridine and 5.0 parts of benzoyl chloride with stirring for 3 hours. The mixture is added to water and hydrochloric acid and the precipitated product is filtered off, washed with alcohol and heated with dilute sodium carbonate solution to dissolve impurities. 2-chloro-9-benzoylamino thiachromono-[2:3-b]-acridone is obtained as a bluish red powder. It is converted into pigmentary form by milling with salt and treating with dimethylformamide as described for the product of Example 1. When incorporated in paints and lacquers it gives bluish red shades of excellent fastness to heat, light and solvent and excellent resistance to change on exposure to the weather. It can also be used to produce very fast bluish red colorations in plastics and fiber forming materials.

*Example 7*

11.6 parts of 2-(2'-chlorophenylamino)-5-(2''-chlorophenylmercapto)-terephthalic acid is added gradually to 58.0 parts of tetraphosphoric acid during 2 hours with stirring at 150° C. The mixture is then heated at 190° to 200° C. for 1 hour, cooled to about 100° C. and slowly diluted with 150 parts of water. The precipitated product is filtered off, washed and purified by precipitation from sulphuric acid as described for the product of Example 2. 4:11-dichloro-thiachromono-[2:3-b]-acridone is obtained as a reddish yellow powder insoluble in most organic solvents. It can be converted into pigmentary form by salt milling and treatment with dimethylformamide as described for the product of Example 1.

The pigment, when incorporated into paints, lacquers or plastics gives bright reddish yellow shades of excellent fastness to heat, light and solvents and excellent resistance to change on exposure to the weather.

*Example 8*

9.1 parts of 2-phenylamino-5-(2':4'-dichlorophenylmercapto)-terephthalic acid is added gradually during 15 minutes to 46 parts of tetraphosphoric acid with stirring at 180° C. The mixture is stirred at 180° C. for 1 hour, and is then allowed to cool to about 100° C. and slowly diluted with about 200 parts of water. The red product is filtered off, washed free from acid, boiled with 1000 parts of 2% sodium carbonate solution, filtered, washed and dried. It is then purified by precipitation from sulphuric acid as described for the product of Example 2. 9:11-dichloro-thiachromonoacridone so obtained is a bright scarlet powder which dissolves in sulphuric acid to give a bright greenish blue solution. The light absorption curve of the sulphuric acid solution shows maxima at 394, 607 and 658 millimicrons. The product may be converted into pigmentary form by salt milling and treatment with dimethylformamide as described for the product of Example 1.

The following table gives further examples of thiachromonoacridone pigments which may be obtained by cyclisation of the terephthalic acid derivatives listed in column 2, using the conditions summarised in columns 3 and 4.

| Example | Terephthalic acid derivative | Dehydrating Agent | Temperature and Time | Substituents in -[2:3-b]-Thiachromonoacridone pigment | Shade |
|---------|------------------------------|-------------------|----------------------|-------------------------------------------------------|-------|
| 9 | 2-(4'-bromophenyl-amino)-5-phenyl-mercapto-. | Tetraphosphoric acid. | 150–160° C./1 hour | 2-bromo- | yellowish red. |
| 10 | 2-phenylamino-5-(2'-chloro-phenylmercapto)-. | ___do___ | ___do___ | 11-chloro- | orange. |
| 11 | 2-(2'-methoxyphenylamino)-5-phenylmercapto-. | ___do___ | ___do___ | 4-methoxy- | red. |
| 12 | 2-(4'-chlorophenylamino)-5-(4''-chloro-2''-methylphenyl-mercapto)-. | Sulphuric acid. | 140–150° C./1 hour | 2:9-dichloro-11-methyl- | yellowish red. |
| 13 | 2-(β-naphthyl-amino)-5-phenylmercapto-. | Tetraphosphoric acid. | ___do___ | 1:2-benz- | orange. |

Example 14

5.5 parts of 2-(4'-chlorophenylamino)-5-(4"-chlorophenylmercapto)-terephthalic acid is stirred with 20 parts of thionyl chloride and 75 parts of monochlorobenzene at 100° C. under reflux for 1 hour. The solution is then cooled to atmospheric temperature and 11.2 parts of powdered aluminium chloride is added gradually with good stirring. The reaction mixture is then stirred at 100° to 110° C. for 3 hours, cooled and the insoluble aluminum chloride complex is filtered off and decomposed by boiling with dilute hydrochloric acid. The 2:9-dichloro-thiachromono-[2:3-b]-acridone is filtered off, washed, boiled with dilute sodium carbonate solution, filtered, washed free from alkali and dried. The product is identical with that of Example 4 and may be purified and converted to pigmentary form as already described.

The following description illustrates the procedure by which the terephthalic acid derivatives used in the above examples may be obtained.

2-nitro-5-phenylmercaptoterephthalic acid may be obtained by adding a solution of 12.5 parts of thiophenol and 7.0 parts of potassium hydroxide in 100 parts of water to a solution of 25 parts of 2-chloro-5-nitroterephthalic acid (obtained as described in German patent specification No. 512,228) and 12 parts of sodium carbonate in 250 parts of water. The solution is heated at 80° C. for 1 hour, more potassium hydroxide being added when necessary to keep it alkaline. The reaction mixture is then acidified with dilute hydrochloric acid and the precipitated 2-nitro-5-phenylmercaptoterephthalic acid is filtered off. When purified by recrystallization from aqueous alcohol it fors yellow prisms of melting point 290° C. Found carbon 53.0%, hydrogen 2.1%, nitrogen 4.5%: $C_{14}H_9O_6NS$ requires carbon 52.7%, hydrogen 2.8%, nitrogen 4.4%.

2-amino-5-phenylmercaptoterephthalic acid may be obtained by adding gradually 18.7 parts of sodium hydrosulphite to a solution of 10 parts of 2-nitro-5-phenylmercapto-terephthalic acid in a solution of 5.9 parts of sodium carbonate in 240 parts of water with stirring at 20° C. The reaction mixture is heated to between 40° and 50° C. for 5 minutes, then acidified with dilute hydrochloric acid, and the precipitated bright yellow 2-amino-5-phenylmercaptoterephthalic acid is filtered off, washed and dried.

2-chloro-5-phenylmercapto-terephthalic acid: 7.2 parts of 2-amino-5-phenylmercaptoterephthalic acid are dissolved in 100 parts of a hot 3% aqueous solution of sodium carbonate and 1.9 parts of sodium nitrite are added. The solution is cooled and added gradually with good stirring to a mixture of 14.5 parts of concentrated hydrochloric acid and 14.5 parts of water which is cooled in ice to keep the temperature between 5° and 10° C. The thick bright yellow suspension of the diazonium compound is stirred for 1 hour at 5° to 10° C. and then added gradually to a stirred solution of 2.5 parts of cuprous chloride in 12 parts of concentrated hydrochloric acid and 6 parts of water, at between 70° and 80° C. The pale yellow 2-chloro-5-phenylmercaptoterephthalic acid precipitated and filtered off.

2-phenylamino-5-phenylmercaptoterephthalic acid (Example 1) may be obtained by heating at between 140° and 150° C. for 20 hours a stirred mixture of 5.0 parts of 2-chloro-5-phenylmercaptoterephthalic acid, 6.4 parts of potassium acetate, 0.1 part of copper powder, 0.1 part of cupric acetate, 4.5 parts of aniline and 50 parts of dimethylformamide. The mixture is diluted with 300 parts of water, made alkaline with sodium carbonate and filtered. The filtrate is acidified and the precipitated 2-phenylamino-5-phenylmercapto-terephthalic acid is filtered off, washed and dried.

By carrying out an analogous series of reactions under conditions similar to those described above there may be obtained:

2 - (4' - chlorophenylamino)-5-phenylmercaptoterephthalic acid (Example 2) from 2-chloro-5-nitroterephthalic acid, thiophenol and 4'-chloroaniline.

2 - phenylamino-5-(4' - chlorophenylmercapto)terephthalic acid (Example 3) from 2-chloro-5-nitroterephthalic acid, p-chlorothiophenol and aniline.

2 - (4'-chlorophenylamino) - 5 - (4" - chlorophenylmercapto)terephthalic acid (Example 4) from 2-chloro-5-nitroterephthalic acid, p-chlorothiophenol and p-chloroaniline.

2 - (4' - chlorophenylamino) - 5 - (4" - acetylaminophenylmercapto)terephthalic acid (Example 5) from 2-chloro-5-nitroterephthalic acid, N:S-diacetyl-p-aminothiophenol and p-chloroaniline.

2 - (2' - chlorophenylamino) - 5 - (2" - chlorophenylmercapto)terephthalic acid (Example 7) from 2-chloro-5-nitroterephthalic acid, o-chlorothionphenol and o-chloroaniline.

2 - phenylamino - 5 - (2':4' - dichlorophenylmercapto) terephthalic acid (Example 8) from 2-chloro-5-nitroterephthalic acid, 2:4-dichlorothiophenol and aniline.

2 - (4' - bromophenylamino) - 5 - phenylmercaptoterephthalic acid (Example 9) from 2-chloro-5-nitroterephthalic acid, thiophenol and p-bromoaniline.

2 - phenylamino - 5 - (2' - chlorophenylmercapto) terephthalic acid (Example 10) from 2-chloro-5-nitroterephthalic acid, o-chlorothiophenol and aniline.

2 - (2' - methoxyphenylamino - 5 - phenylmercapto) terephthalic acid (Example 11) from 2-chloro-5-nitroterephthalic acid, thiophenol and o-anisidine.

2 - (4" - chlorophenylamino) - 5 - (4" - chloro - 2"-methylphenylmercapto)-terephthalic acid (Example 12) from 2-chloro-5-nitroterephthalic acid, 4-chloro-2-methylthiophenol and p-chloroaniline.

2 - β - naphthylamino - 5 - phenylmercaptoterephthalic acid from 2-chloro-5-nitroterephthalic acid, thiophenol and β-naphthylamine.

The following is illustrative of the procedure by which the terephthalic acid derivatives may be obtained from dimethyl-2:5-dibromoterephthalate.

A solution of 4.2 parts of p-chlorothiophenol in 55 parts of dry pyridine is stirred at the boil with 1.6 parts of powdered potassium hydroxide for 20 minutes. 14.0 parts of dimethyl 2:5-dibromoterephthalate is then added and the mixture is stirred and boiled under reflux for 20 hours. The reaction mixture is then diluted with water and the pyridine removed by steam distillation. The residue is acidified and the solid is filtered off. It is hydrolysed to 2-bromo-5(p-chlorophenylmercapto)-terephthalic acid by boiling for 3 hours with a solution of 5 g. of potassium hydroxide in 100 parts of alcohol. The solution is diluted with water, filtered and the acid precipitated by the addition of diute hydrochloric acid. The yellow precipitate is filtered, washed and dried. The product so obtained (10.5 parts) is stirred at 140° to 150° C. with 60 parts of dimethylformamide, 11.0 parts of potassium acetate, 0.2 part of copper powder, 0.2 part of cupric acetate and 7.8 parts of aniline for 20 hours. The mixture is then diluted with 500 parts of water, made alkaline by addition of sodium carbonate and filtered. The filtrate is acidified with dilute hydrochloric acid and the precipitated 2-phenylamino-5(4'-chlorophenylmercapto)-terephthalic acid is precipitated, filtered off, washed and dried.

The following experimental procedure may also be used: 1.8 parts of powdered potassium hydroxide is added to a solution of 4.2 parts of p-chlorothiophenol in 30 parts of dimethylformamide, and stirred at the boil for 10 minutes. 14 parts of dimethyl-2:5-dibromoterephthalate is added and the mixture was stirred at 140° to 150° for 20 hours. 12 parts of aniline, 5.0 parts of potassium acetate, 0.3 part of copper powder and 0.3 g. of cupric acetate are then added and the mixture is stirred at the boil for another 24 hours. The mixture is diluted with about 500 parts of water, made alkaline with sodium carbonate, heated and filtered hot. The solid residues are re-extracted with hot dilute sodium carbonate solution and the extracts are combined with the main filtrates, acidified and the precipitate filtered off, washed and dried. Yield about 8 parts.

I claim:
1. A compound of the formula

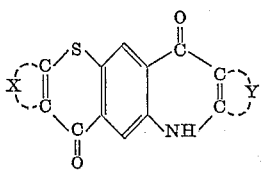

wherein X and Y each represent the atoms necessary to complete a member of the group consisting of a benzene and naphthalene nucleus and such nuclei which carry substituents selected from the group consisting of halogen atoms, lower alkyl, lower alkoxy, amino, acetylamido, α-furoylamido, p-toluene sulphonamido, benzoylamido and substituted benzoylamido selected from the group consisting of o-, m- and p-chloro, -methoxy and -nitro benzoylamido, phthalimido and β-naphthoylamido.

2. Thiachromono-[2:3-b] acridone in which at least one of the two outermost rings carry halogen atoms as substituents.

3. Thiachromono-[2:3-b] acridone in which at least one of the two outermost rings carry chlorine atoms as substituents.

4. A process for the manufacture of a compound of the formula

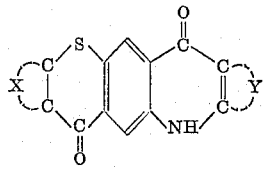

wherein X and Y each represent the atoms necessary to complete a member of the group consisting of a benzene and a naphthalene nucleus and such nuclei which carry substituents selected from the group consisting of halogen atoms, lower alkyl, lower alkoxy, amino, acetylamido, α-furoylamido, p-toluene sulphonamido, benzoylamido, and substituted benzoylamido selected from the group consisting of o-, m- and p-chloro, -methoxy and -nitro benzoylamido, phthalimido and β-naphthoylamido, which comprises cyclizing at least one dicarboxylic compound of the group consisting of dicarboxylic acids of the formula:

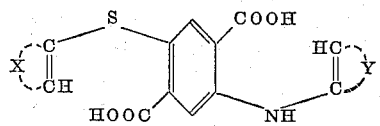

and lower alkyl esters thereof wherein X and Y have the meanings stated above, by treatment with a member of the group consisting of sulphuric acid, phosphoric acid, polyphosphoric acid, chlorosulphonic acid, phosphorus trichloride, phosphoruspentachloride and aluminum chloride.

5. Process according to claim 4 wherein the dicarboxylic compound is obtained from a 2:5-dihalogenoterephthalate, by condensation with a mercapto compound and an amine.

No references cited.